3,138,594
4,7-DIAMINO-N-(2,2-DIALKOXYETHYL)-2-ARYL-6-PTERIDINECARBOXAMIDES
Thomas S. Osdene, West Chester, and Arthur A. Santilli, Ardmore, Pa., assignors to American Home Products Corporation, New York, N.Y., a corporation of Delaware
No Drawing. Filed Nov. 20, 1962, Ser. No. 239,065
6 Claims. (Cl. 260—251.5)

This invention is concerned with novel 6-pteridinecarboxamides and with processes for the production thereof.

The novel compounds sought to be patented exhibit valuable therapeutic applications as antiviral agents and as diuretics. They are represented by the following general formula:

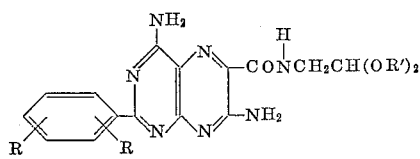

in which R represents hydrogen, lower alkyl, lower alkoxy, or a halogen atom having an atomic weight less than 80, and R' is a lower alkyl radical having from 1 to 4 carbon atoms. Where the 2-aryl radical is monosubstituted, it is understood that the substituent may be in either the ortho-, the para- or the meta- position.

The novel compounds of this invention preferably are prepared by heating in an anhydrous neutral polar solvent in the presence of a catalytic amount of an alkaline condensation agent, approximately equimolar amounts of a 4,6-diamino-5-nitrosopyrimidine and a 2-cyano-N-(2,2-dialkoxyethyl)-acetamide. Suitable neutral polar solvents include methanol, propanol, ethanol, butanol, glycol ethers such as 2-methoxy ethanol, 2-ethoxy ethanol, methoxy and ethoxy propanols as well as amides such as dimethylforamide, diethylformamide and dimethyl acetamide. Agents suitable for promoting this reaction include the alkali metals, their alkoxides and their alkoxyalkoxides. Preferred among these are sodium metal, sodium methoxide, potassium ethoxide and sodium α-ethoxy ethoxide. Reaction temperatures of about 60 to 200° C. are suitable. It is generally preferred, however, to conduct the reaction at or near the boiling point of the reaction mixture and under autogenous pressure.

The starting 2-cyano-N-(2,2-dialkoxyethyl)-acetamide such as 2-cyano-N-(2,2-diethoxyethyl)acetamide is prepared by refluxing ethyl cyanoacetate, aminoacetaldehyde diethyl acetal and ethanol.

All the products of the invention can be purified by dissolving them in a lower alkanol solvent such as ethanol or 2-ethoxyethanol.

The following examples, in which all temperatures are given in degrees Centigrade, illustrate the best mode of carrying out the invention.

*Example 1*

A mixture of 22.6 g. of ethyl cyanoacetate, 27.6 g. of aminoacetaldehyde diethyl acetal and 35 ml. of ethanol was boiled under reflux for 90 minutes. The solvent was removed on a rotary evaporator and the oil residue solidified on cooling and scratching. The solid was removed by filtration and was recrystallized from a mixture of cyclohexane and ethanol to yield 2-cyano-N-(2,2-diethoxyethyl)-acetamide, M.P. 52–3° C.

Analysis.—Calculated: C=53.98; H=8.06; N=13.99. Found: C=53.74; H=7.98; N=14.30.

*Example 2*

To a solution of 0.2 g. of sodium in 500 ml. of absolute ethanol was added 6.45 g. of 4,6-diamino-5-nitroso-2-phenylpyrimidine, and the mixture was heated to boiling point. Following this 7.0 g. of 2-cyano-N-(2,2-diethoxyethyl)acetamide was added and the mixture was boiled under reflux for 15 minutes, during which time the color changed from green to yellow. After concentration to small bulk and cooling, there was deposited a yellow material, wt.=12.0 g., M.P. 234–235° C.

Recrystallization from ethanol afforded 4,7-diamino-N-(2,2-diethoxyethyl)-2-phenyl - 6-pteridinecarboxamide, M.P. 235–236° C.

Analysis.—Calculated: C=57.42; H=5.83; N=24.67. Found: C=57.42; H=5.70; N=24.43.

*Example 3*

To a solution of 0.2 g. of sodium in 500 ml. of absolute ethanol was added 7.5 g. of 4,6-diamino-5-nitroso-2-p-chlorophenylpyrimidine followed by 7.0 g. of 2-cyano-N-(2,2-diethoxyethyl)acetamide. The mixture was boiled under reflux for 15 minutes and allowed to stand overnight, during which time a yellow crystalline deposit was obtained, wt.=10.6 g. Recrystallization from ethanol yielded 4,7-diamino-N-(2,2-diethoxyethyl) - 2 - p - chlorophenyl-6-pteridinercarboxamide, M.P. 248° C.

Analysis.—Calculated: C=52.84; H=5.14; N=22.70; Cl=8.21. Found: C=52.87; H=5.30; N=22.47; Cl=8.31.

*Example 4*

To a solution of 0.2 g. of sodium in 500 ml. of absolute ethanol was added 6.9 g. of 4,6-diamino-5-nitroso-2-p-tolylpyrimidine, followed by 7.0 g. of 2-cyano-N-(2,2-diethoxyethyl)acetamide. The mixture was boiled under reflux for 30 minutes and on cooling there was obtained a yellow material, wt.=8.2 g. Recrystallization from ethanol afforded 4,7-diamino-N-(2,2-diethoxyethyl)-2-p-tolyl-6-pteridinecarboxamide, M.P. 249–250° C.

Analysis.—Calculated: C=58.37; H=6.12; N=23.83. Found: C=58.34; H=5.97; N=24.02.

*Example 5*

4,7-diamino - N - (2,2-dimethoxyethyl)-2-p-methoxyphenyl-6-pteridinecarboxamide is prepared from 7.35 g. of 4,6-diamino-2-p-methoxyphenyl-5-nitrosopyrimidine and 5.7 g. of 2-cyano-N-(2,2-dimethoxyethyl)acetamide by the procedure of Example 2.

*Example 6*

4,7-diamino-2-(3,4-dichlorophenyl)-N-(2,2 - diethoxyethyl)-6-pteridinecarboxamide is prepared from 8.52 g. of 4-6-diamino-2-(3,4-dichlorophenyl)-5 - nitrosopyrimidine and 7 g. of 2-cyano-N-(2,2-diethoxyethyl)acetamide by the procedure of Example 2.

*Example 7*

4,7-diamino-N-(2,2-dipropoxyethyl) - 2-o-tolyl-6-pteridinecarboxamide is prepared from 6.8 g. of 4,6-diamino-5-nitroso-2-o-tolylpyrimidine and 7.5 g. of 2-cyano-N-(2,2-dipropoxyethyl)acetamide following the procedure of Example 2.

The novel compounds sought to be patented can be administered in a wide variety of oral or parenteral dosage forms singly, or in admixture with other active compounds. They can be associated with a pharmaceutical carrier in which the compound is dissolved, dispersed or suspended. The solid compositions can take the form of tablets, powders, capsules, pills, or the like, preferably in unit dosage forms. The liquid compositions can take the form of emulsions, suspensions or syrups.

In all these forms, the subject compounds find extensive use in experimental pharmacology. Thus, for this purpose, the compounds are useful for determining the relation of the total diuretic effect of the compounds to their oil-water partition coefficients.

What is claimed is:

1. A compound of the formula:

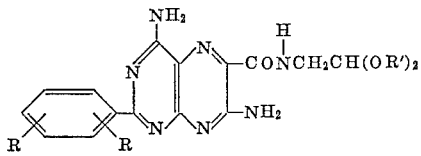

wherein R is selected from the group consisting of hydrogen, (lower)alkyl, (lower)alkoxy and halogen having an atomic weight less than 80, and R' is a (lower)alkyl radical having from 1 to 4 carbon atoms in the chain.

2. 4,7-diamino - N - (2,2-diethoxyethyl)-2-phenyl-6-pteridinecarboxamide.

3. 4,7-diamino - N - (2,2-diethoxyethyl)-2-p-chlorophenyl-6-pteridinecarboxamide.

4. 4,7-diamino - N - (2,2-diethoxyethyl)-2-p-tolyl-6-pteridinecarboxamide.

5. 2-cyano-N-(2,2-diethoxyethyl)acetamide.

6. A compound of the formula:

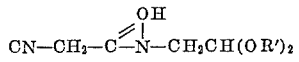

wherein R' is a lower alkyl radical having from 1 to 4 carbon atoms in the chain.

References Cited in the file of this patent

UNITED STATES PATENTS

| | | |
|---|---|---|
| 2,963,478 | Weinstock | Dec. 6, 1960 |
| 2,975,180 | Osdene et al. | Mar. 14, 1961 |